July 3, 1956  S. W. GATES  2,753,548
TEMPERATURE INDICATING AND WARNING SYSTEM
Filed April 5, 1954

Sheldon W. Gates
*INVENTOR.*

United States Patent Office 2,753,548
Patented July 3, 1956

2,753,548

TEMPERATURE INDICATING AND WARNING SYSTEM

Sheldon W. Gates, Scottsdale, Ariz.

Application April 5, 1954, Serial No. 420,939

5 Claims. (Cl. 340—227)

My invention relates to improvements in temperature indicating and warning systems.

It is an object of my invention to provide a portable temperature indicating and warning system which will show at a glance if ambient temperature lies in a desirable zone. It is a further object of my invention to provide a portable temperature indicating and warning system which can give indications at a point remote from the temperature-sensitive mechanism. It is a further object of my invention to provide, in response to temperature conditions, flashing indications, continuous indications, or absence of indications by each of the various indicators as may be desired for the particular application. Other objects and advantages of my invention will be apparent during the course of the detailed description.

My invention is designed to fill a need for a device which can show at a glance if ambient temperature lies within a predetermined safety zone. It is often desirable to know, for example, that a hospital room or a child's play room is warm enough, or cool enough as the case may be, for the comfort and safety of its occupants. Although one can consult a thermometer, it is more desirable to employ a system which will show temperature conditions at a casual glance. The indications should be clearly visible at a distance of many yards and should be as distinct at night as in the daytime. At night it may also be desirable to have persons in remote areas of the building wakened if the temperature in one of the special rooms passes out of the desired safety zone. This would allow them to take immediate corrective measures. My invention fulfills these requirements and others as will be demonstrated in the following detailed description.

Figure 1:
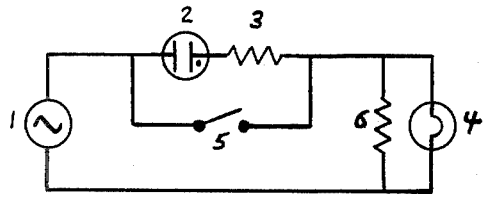

Figure 1 is a schematic diagram showing the electrical circuitry of a simple version of my invention, in which The single-arm thermostat 5 is normally of the bimetallic 1 is a source of power. Although an alternating current source is shown, it is to be understood that a direct current source may be employed if desired. Neon lamp 2 and resistor 3 together comprise a high-resistance type indicating lamp. It is to be understood that neon lamp 2 and its conventional series resistor 3 together constitute the indicator and that they may be replaced with any suitable high-resistance type lamp, not necessarily of the neon type. Lamp 4 represents a low-resistance indicator. Although a lamp is shown in the drawing, it is to be understood that any low-resistance indicator may be used here, such as a bell, buzzer, call signal, radio, or other indicator device. The resistance element 6 has low resistance when compared to the high-resistance indicator 2, 3, but has high-resistance when compared to the low-resistance indicator 4. Its purpose is to complete the electrical path in the event indicator 4 is not connected. type. It is to be understood, however, that the construction of the thermostat does not bear on this invention and any suitable thermally-operated switch may be used. The thermostat may be of the fixed or adjustable type, each having its particular advantages. Thermostat 5 may be of the type that opens on temperature rise or the type that closes on temperature rise, depending on the indications desired. If a warning indication is desired when ambient temperature falls below a predetermined level, a thermostat which opens on temperature rise is employed. If it is desired to provide warning indications when ambient temperature rises above a predetermined level, a thermostat which closes on temperature rise is used. The invention is shown schematically in Figure 1 and operates as follows: When temperature conditions are such that thermostat 5 is open (the normal condition), the high-resistance indicator 2, 3 will operate. The low-resistance indicator 4 will not operate, as virtually the full voltage of the power source will appear across indicator 2, 3, due to its relatively high resistance. An important feature of this as well as the other variations of my invention is that indicator 2, 3 serves double duty as a night light or guide light in the room or area being protected by my invention. At such time as ambient temperature falls below the predetermined level (or rises above the predetermined level as the case may be), thermostat 5 will close, shorting indicator 2, 3 and consequently activating indicator 4. Indicator 4 is the remote warning indicator, and it operates to call the attention of interested persons to the fact that temperature conditions in the special room are not as desired. Indicator 4 is normally operated at a point some distance from the temperature-sensitive mechanism, and, if desired, may be connected (along with an extension wire) by any conventional plug and socket arrangement. Resistor 6 completes the electrical circuit to allow proper operation of indicator 2, 3 in the event indicator 4, for any reason, is not connected. The absence of light from indicator 2, 3 also provides a local indication that temperatures are not as desired. As indicator 2, 3 normally functions as a night light or guide light, its indication will be missed quickly. At this point it should be mentioned that indicator 4 can, if desired, be replaced by a suitable heating element or furnace control circuit to automatically provide heat in the protected area when ambient temperature falls below the predetermined safety level. The plug and socket arrangement for indicator 4, discussed earlier, would facilitate such a connection. Although the device would then be operating as a conventional thermostatically-controlled heating system and not primarily as an indicating system, the ability of my invention to be readily converted to such use is one of its features.

Figure 2:
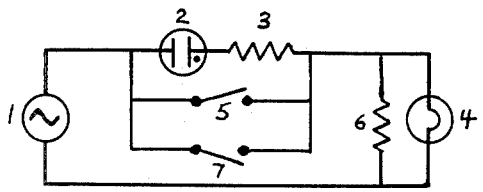

Figure 2 shows an extension of the invention disclosed in Figure 1 and the above description. By adding a second single-arm thermostat 7, opposite in character to thermostat 5, warning indications will be obtained whenever temperatures pass out of a predetermined safety zone in either direction. If thremostat 5 is designed to close when ambient temperature falls below a predetermined level, thermostat 7 must be designed to close when ambient temperature rises above a different predetermined level. On the other hand, if thermostat 5 is designed to close when ambient temperature rises above a predetermined level, thermostat 7 must be designed to close when ambient temperature falls below a different predetermined level. If we call the closing temperature of thermostat 5 (which, for example, opens on temperature rise) temperature A, and that of thermostat 7 (which, for example, closes on temperature rise) temperature B, the following conditions will prevail. When ambient temperature is below temperature A, thermostat 5 will be closed, shorting indicator 2, 3 operating warning indicator 4. When ambient temperature is above temperature A but below temperature B (the safety zone), both thermostats will be open allowing indicator 2, 3 to operate in the normal manner. Indicator 4 will not operate because its resistance is low when compared with indicator 2, 3. If ambient temperature rises above temperature B, thermostat 7 will close, shorting indicator 2, 3, operating warning indicator 4. Thus it can be seen that warning indicator 4 operates whenever ambient temperature passes out of the predetermined safety zone lying between temperatures A and B.

Figure 3:
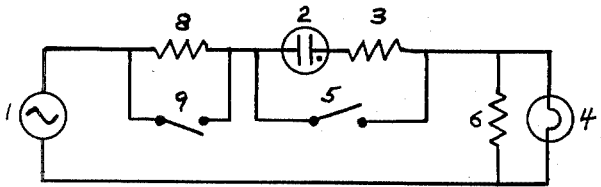

Figure 3 shows another variation of the invention disclosed in Figure 1 and described above. It will be noted that Figure 3 is identical to Figure 1 in all respects except for the addition of elements 8 and 9. 8 and 9 together represent a series-connected circuit-interrupting device, or flasher, which obtains its operating power from power source 1. The flasher consists of a resistance element 8 and bimetal contact arm 9. The heating element 8 of the flasher 8, 9, is of low resistance when compared with indicator 2, 3 but of high resistance when compared with indicator 4. Because resistance element 8 generates heat in operation, it obviously cannot be operated in close physical proximity with the temperature-sensitive thermostats described in my invention. A convenient location would be at the connection to power source 1, perhaps at the end of a power cord. The operation of my invention as illustrated in Figure 3 with flasher 8, 9 a part thereof, is as follows: When temperature conditions are such that thermostat 5 is open (the normal condition), indicator 2, 3 will operate as before because the resistance of heating element 8 and the resistance of indicator 4 are low when compared with the resistance of indicator 2, 3. Indicator 2,3 will operate as a night light or guide light, showing normal temperature. If ambient temperature changes so that thermostat 5 closes, indicator 2, 3 will be shorted and it will no longer operate, warning of the adverse temperature condition. As the resistance of heating element 8 is higher than the resistance of indicator 4, most of the voltage of power source 1 will appear across resistance 8, causing it to heat. The heat generated by resistance 8 will cause the bimetallic switch 9 to deform until its contacts close. When the contacts close, resistance 8 is shorted, causing the full voltage of power source 1 to appear across indicator 4, making it operate. Resistance 8 cools in the meantime, however, and after several seconds the contacts of bimetallic switch 9 will open and essentially the full voltage of power source 1 will again appear across resistance 8. Indicator 4 again does not operate under these conditions. This cycle is repeated in such a manner that indicator 4 will operate rhythmically on and off to call attention to the undesired temperature condition. It should be noted that as flasher 8, 9 causes indicator 4 to operate rhythmically, indicator 2, 3 remains entirely inoperative. This is an important characteristic of this part of my invention, as it is believed that the local night light or guide light should not operate rhythmically as such flashing light might disturb or alarm the occupants of the room being protected by my invention.

Figure 4:
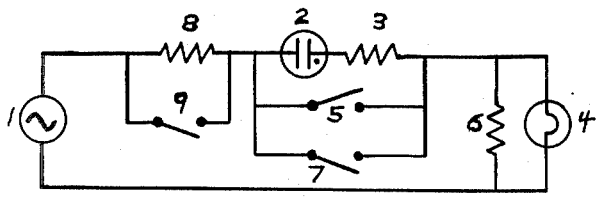

Figure 4 shows another variation of my invention which operates in the same manner as the circuit of Figure 3 just described, except that an additional thermostat has been added to provide additional protection as was done in Figure 2. The description of Figure 2, above, covers the operation of Figure 4 in so far as the addition of thermostat 7 is concerned.

Figure 5:
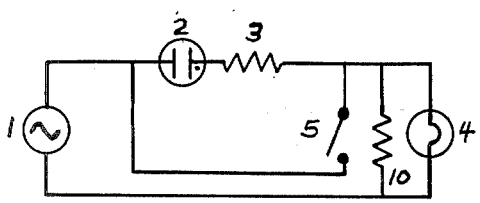

Another variation of my invention suitable for giving flashing warnings when ambient temperature falls below a predetermined level is illustrated in Figure 5. The elements are as previously described except that a resistance 10, electrically connected in parallel with indicator 4, is mounted in close physical proximity with thermostat 5. Operation is as follows: When ambient temperature is above the predetermined level, thermostat 5 is open. Because the resistance of indicator 2, 3 is much greater than the resistance of indicator 4, virtually the full voltage of power source 1 appears across indicator 2, 3 causing it to operate in the normal manner as a night light or guide light. Indicator 4 does not operate. When ambient temperature falls sufficiently to cause thermostat 5 to close, indicator 2, 3 is shorted, allowing the full voltage of power source 1 to appear across indicator 4 and resistance 10. Indicator 4 operates and resistance 10 generates heat. Because resistance 10 is mounted in close physical proximity with thermostat 5, the heat generated by resistance 10 causes thermostat 5 to open after a few seconds. Indicator 4 then goes out. Indicator 2, 3 operates and resistance 10 cools off. In a short time the low ambient temperature again cools thermostat 5 and it closes. Thus the cycle repeats itself as long as the ambient temperature is below the predetermined level. The rhythmic cycling of thremostat 5 and indicator 4 adds the desired flashing feature to the warning signals. Resistance 10, it should be noted, doubles as a heating element to provide the flashing indications and a circuit-completing element to allow operation of indicator 2, 3 in the absence of indicator 4.

What I claim then is:

1. A series-connected combination of a power source, a low-resistance indicator having a resistance element connected in parallel therewith, and a high-resistance indicating lamp; and means for short-circuiting the high-resistance indicating lamp in response to temperature conditions, all of the elements being suitably connected such that when thermal conditions cause one indicator to operate, the other will be non-operative, and suitably connected such that when, for any reason, the low-resistance indicator is electrically disconnected, the high-resistance indicating lamp will continue to respond to thermal conditions as if the low-resistance indicator were present.

2. A series-connected combination of a power source, a low-resistance indicator having a resistance element connected in parallel therewith, a high-resistance indicating lamp, and a circuit-interrupting device of the type that is connected in series with the power source and is thermally operated by means of a bimetallic arm and set of contacts and a resistance element to generate the necessary heat; and means for short-circuiting the high-resistance indicating lamp in response to temperature conditions; all of the elements being suitably connected such that when thermal conditions cause one indicator to operate, the other will be non-operative, and when thermal conditions cause the low-resistance indicator to operate it will do so in an "on and off" cycling manner and the high-resistance indicating lamp will be non-operative, and suitably connected such that when, for any reason, the low-resistance indicator is electrically disconnected, the high-resistance indicating lamp will continue to respond to thermal conditions as if the low-resistance indicator were present.

3. A series-connected combination of a power source, a low-resistance indicator having a resistance element connected in parallel therewith, a high-resistance indicating lamp; and a circuit-interrupting device of the type that is connected in series with the power source and is thermally operated by means of a bimetallic arm and set of contacts and a resistance element to generate the necessary heat; and a single-arm single-contact thermostat switch connected so as to short-circuit the high-resistance indicating lamp in response to temperature conditions, all of the elements being suitably connected such that when thermal conditions cause one indicator to operate, the other will be non-operative, and when thermal conditions cause the low-resistance indicator to operate it will do so in an "on and off" cycling manner and the high-resistance indicating lamp will be non-operative, and suitably connected such that when, for any reason, the low-resistance indicator is electrically disconnected, the high-resistance indicating lamp will continue to respond to thermal conditions as if the low-resistance indicator were present.

4. A series-connected combination of a power source, a low-resistance indicator having a resistance element connected in parallel therewith, a high-resistance indicating lamp, and a circuit-interrupting device of the type that is connected in series with the power source and is thermally operated by means of a bimetallic arm and set of contacts and a resistance element to generate the necessary heat; and a single-arm single-contact thermostat switch which opens on temperature rise parallel connected with a single-arm single-contact thermostat switch which closes on temperature rise connected so as to short-circuit the high-resistance indicating lamp in response to temperature conditions, all of the elements being suitably connected such that when thermal conditions cause one indicator to operate, the other will be nonoperative, and when thermal conditions cause the low-resistance indicator to operate it will do so in an "on and off" cycling manner and the high-resistance indicating lamp will be non-operative, and suitably connected such that when, for any reason, the low-resistance indicator is electrically disconnected, the high-resistance indicating lamp will continue to respond to thermal conditions as if the low-resistance indicator were present.

5. A series-connected combination of a power source, a low-resistance indicator having a resistance element connected in parallel therewith, and a high-resistance indicating lamp; and a single-arm single-contact thermostat switch located in close proximity to the resistance element and connected so as to short-circuit the high-resistance indicating lamp in response to temperature conditions, all of the elements being suitably connected such that when thermal conditions cause one indicator to operate, the other will be nonoperative, and when thermal conditions cause the low-resistance indicator to operate, it and the high-resistance indicating lamp will alternately operate in a rhythmic cycling manner, and suitably connected such that when, for any reason, the low-resistance indicator is electrically disconnected, the high-resistance indicating lamp will continue to respond to thermal conditions as if the low-resistance indicator were present.

References Cited in the file of this patent
UNITED STATES PATENTS

| | | |
|---|---|---|
| 2,402,312 | Burch | June 18, 1946 |
| 2,450,450 | Schmidinger | Oct. 5, 1948 |